US012569407B2

(12) United States Patent
Ahmed et al.

(10) Patent No.: US 12,569,407 B2
(45) Date of Patent: Mar. 10, 2026

(54) MEDICATION DOSAGE REMINDER APPARATUS

(71) Applicants: Omar Ahmed, Spring Valley, NY (US); Hasan Abunar, Spring Valley, NY (US)

(72) Inventors: Omar Ahmed, Spring Valley, NY (US); Hasan Abunar, Spring Valley, NY (US)

( * ) Notice: Subject to any disclaimer, the term of this patent is extended or adjusted under 35 U.S.C. 154(b) by 231 days.

(21) Appl. No.: 18/207,504

(22) Filed: Jun. 8, 2023

(65) Prior Publication Data

US 2024/0407974 A1 Dec. 12, 2024

(51) Int. Cl.
*A61J 7/04* (2006.01)
*A61J 1/14* (2023.01)

(52) U.S. Cl.
CPC ........... *A61J 7/0481* (2013.01); *A61J 1/1412* (2013.01)

(58) Field of Classification Search
CPC .............................. A61J 7/0481; A61J 1/1412
USPC .............................................................. 221/2
See application file for complete search history.

(56) References Cited

U.S. PATENT DOCUMENTS 1,717,060 A * 6/1929 Mottayaw ................. A61J 7/04 116/DIG. 1
2,296,551 A * 9/1942 Ylio ......................... G09D 3/06 40/112
2,916,837 A * 12/1959 Bosland ................... G09D 3/06 40/114
2,945,312 A * 7/1960 Book ..................... G09B 29/00 40/503
3,215,344 A * 11/1965 Joffe ........................ G06C 3/00 235/78 R
3,901,407 A * 8/1975 Mitchell ................ B60K 15/04 220/326
4,037,719 A * 7/1977 Perlmutter ............ A24F 15/005 131/270
4,383,425 A * 5/1983 Orabona ................. E05B 37/02 70/312
4,722,208 A * 2/1988 Ye ........................... E05B 37/02 70/312
4,926,572 A * 5/1990 Holmes ..................... G09F 3/00 40/448
5,011,032 A * 4/1991 Rollman ................... A61J 7/04 116/323
5,377,614 A * 1/1995 Glazer .................... G09F 11/23 116/318
5,574,268 A * 11/1996 Herman ................ G06M 1/163 116/223
6,000,159 A * 12/1999 Hornung ................. G09F 11/23 215/230
6,145,697 A * 11/2000 Gudish ................. A61J 7/0481 221/3

(Continued)

FOREIGN PATENT DOCUMENTS

WO WO2011146664 11/2011

*Primary Examiner* — Rakesh Kumar

(57) ABSTRACT

A medication dosage reminder apparatus for displaying dosage information for a medication on a medication container which contains the medication includes a cover configured to be mounted to a medication container. At least one indicator assembly is coupled to the cover to indicate dosage information for a medication stored in the medication container. The indicator assembly is configurable to display a selected dosage indicia.

2 Claims, 7 Drawing Sheets

(56) References Cited

U.S. PATENT DOCUMENTS

| | | | | |
|---|---|---|---|---|
| 6,259,654 | B1 * | 7/2001 | de la Huerga | A61J 7/0481 368/10 |
| 6,276,533 | B1 * | 8/2001 | Kaplan | B65D 51/245 206/459.1 |
| 6,652,047 | B1 * | 11/2003 | Maguire, Jr. | A61J 7/04 206/534 |
| 6,786,346 | B1 * | 9/2004 | Gurnard | B65D 51/245 220/320 |
| 7,555,995 | B1 * | 7/2009 | Stump | A61J 7/04 116/318 |
| 7,621,273 | B2 * | 11/2009 | Morton | A61M 15/0065 128/205.23 |
| 7,661,384 | B2 | 2/2010 | Mataya | |
| 7,766,188 | B2 * | 8/2010 | Pocock | G06M 1/248 222/23 |
| 7,886,909 | B2 | 2/2011 | Robinson | |
| 8,146,528 | B2 * | 4/2012 | Fralick | A61J 7/04 116/316 |
| 8,534,220 | B1 | 9/2013 | Olson | |
| 8,857,617 | B2 | 10/2014 | Balakier | |
| 8,896,428 | B2 * | 11/2014 | Shalala | A61J 7/0481 340/309.16 |
| 8,938,999 | B2 * | 1/2015 | Dahl | B65D 55/145 70/165 |
| 9,021,980 | B1 | 5/2015 | Vasta | |
| 9,259,375 | B2 * | 2/2016 | Miller | A61J 1/03 |
| D794,448 | S | 8/2017 | Mataya | |
| 9,861,554 | B2 | 1/2018 | Ammar | |
| 11,535,435 | B2 * | 12/2022 | Netter | G06V 40/172 |
| 11,628,123 | B2 * | 4/2023 | Chambers | A61J 7/04 206/534 |
| 11,932,469 | B2 * | 3/2024 | Concari | B65D 51/245 |
| 2006/0180566 | A1 * | 8/2006 | Mataya | A61J 1/1425 215/230 |
| 2006/0207958 | A1 * | 9/2006 | Hamer | E05B 73/0041 215/206 |
| 2008/0098939 | A1 * | 5/2008 | Kalous | E05G 1/005 109/52 |
| 2009/0139516 | A1 * | 6/2009 | Augustyn | G06M 3/025 128/200.23 |
| 2009/0242452 | A1 * | 10/2009 | Perry | B65D 83/0481 206/534 |
| 2011/0210136 | A1 * | 9/2011 | Wang | B65D 55/145 220/831 |
| 2011/0284415 | A1 * | 11/2011 | Balakier | B65D 41/06 206/459.1 |
| 2013/0074833 | A1 * | 3/2013 | Sieffert | A61M 15/0076 29/446 |
| 2014/0214200 | A1 * | 7/2014 | Chrusciel | A61J 7/0076 221/15 |
| 2014/0352603 | A1 * | 12/2014 | Gortot | G09F 3/06 116/308 |
| 2015/0078139 | A1 * | 3/2015 | Raiti de Boyles | A61J 7/04 368/10 |
| 2022/0378660 | A1 * | 12/2022 | Yarto | A61J 7/0481 |
| 2023/0130906 | A1 * | 4/2023 | Baker | B65D 41/0471 220/287 |
| 2024/0407974 | A1 * | 12/2024 | Ahmed | A61J 1/1412 |

* cited by examiner

MEDICATION DOSAGE REMINDER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to medication dosage reminder apparatuses and more particularly pertains to a new medication dosage reminder apparatus for displaying dosage information for a medication on a medication container which contains the medication.

(2) Description of Related Art Including Information Disclosed Under 37 CFR 1.97 and 1.98

The prior art includes myriad medication dosage reminder apparatuses for indicating dosage information for a medication on a medication container which contains the medication. Many of these apparatuses define a cap which attaches to the medication container and have rotating members which rotate around the same axis that the cap rotates around to attach to the medication container. However, the prior art does not describe such an apparatus which clamps to a cap for the medication container and has indicators which are rotatable to select indicia indicating dosage information. Such a device would be advantageous as an alternative to the apparatuses disclosed by the prior art.

BRIEF SUMMARY OF THE INVENTION

An embodiment of the disclosure meets the needs presented above by generally comprising a cover configured to be mounted to a medication container. At least one indicator assembly is coupled to the cover for indicating dosage information for a medication stored in the medication container. The at least one indicator assembly comprises a rotating member and a plurality of dosage indicia. The rotating member is rotatably coupled to the cover, and a section of a perimeter surface of the rotating member protrudes outwardly of the cover and defines a viewable position of the section of the rotating member. The rotating member is rotatable in a first direction and a second direction relative to the cover. The plurality of dosage indicia is positioned on and circumferentially arranged around the perimeter surface of the rotating member. The rotating member is rotatable with respect to the cover to position a selected one of the dosage indicia at the viewing position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
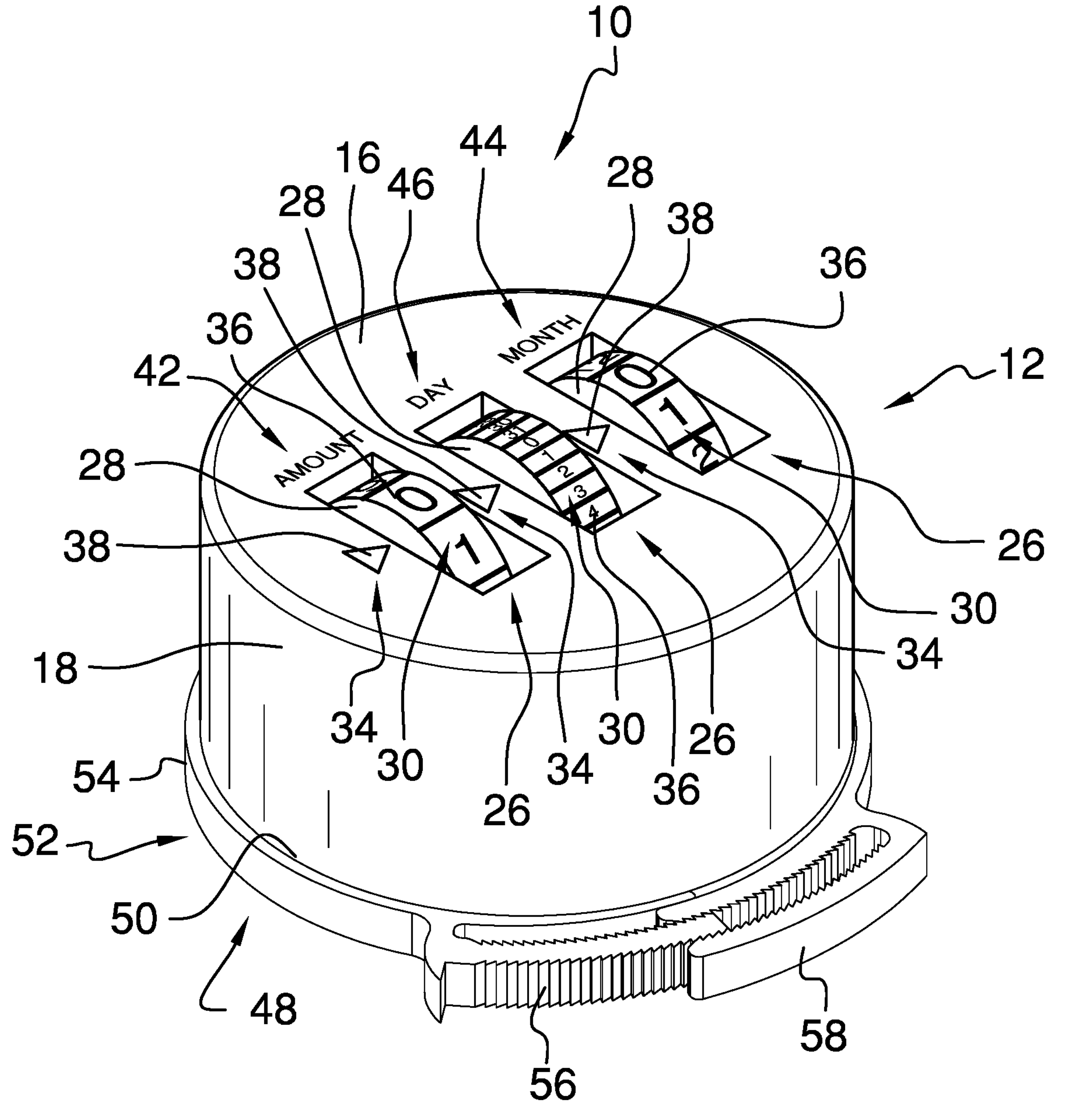
FIG. 1 is a top perspective view of a medication dosage reminder apparatus according to an embodiment of the disclosure.
Figure 2:
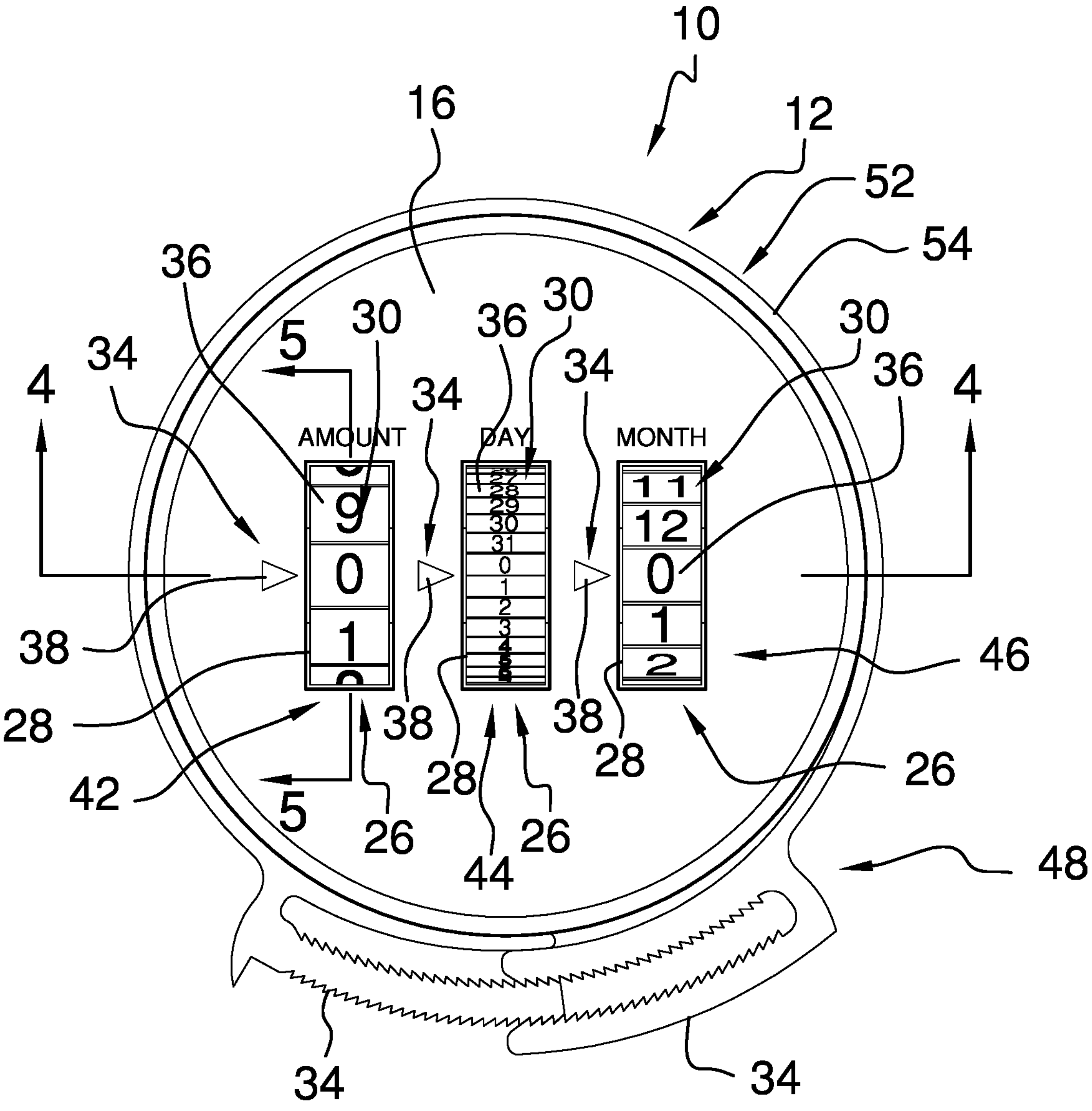
FIG. 2 is a top view of an embodiment of the disclosure.
Figure 3:
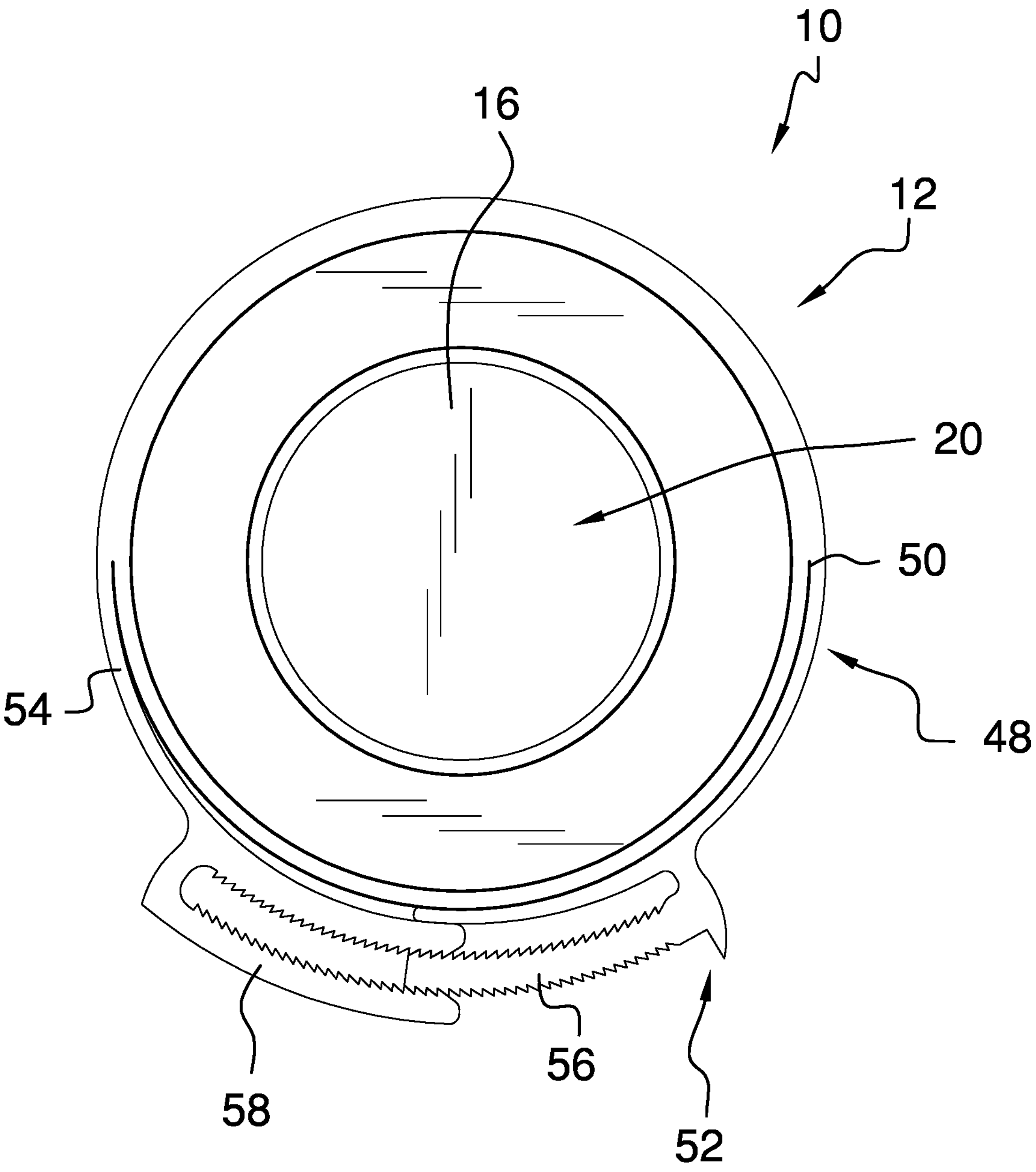
FIG. 3 is a bottom view of an embodiment of the disclosure.
Figure 4:
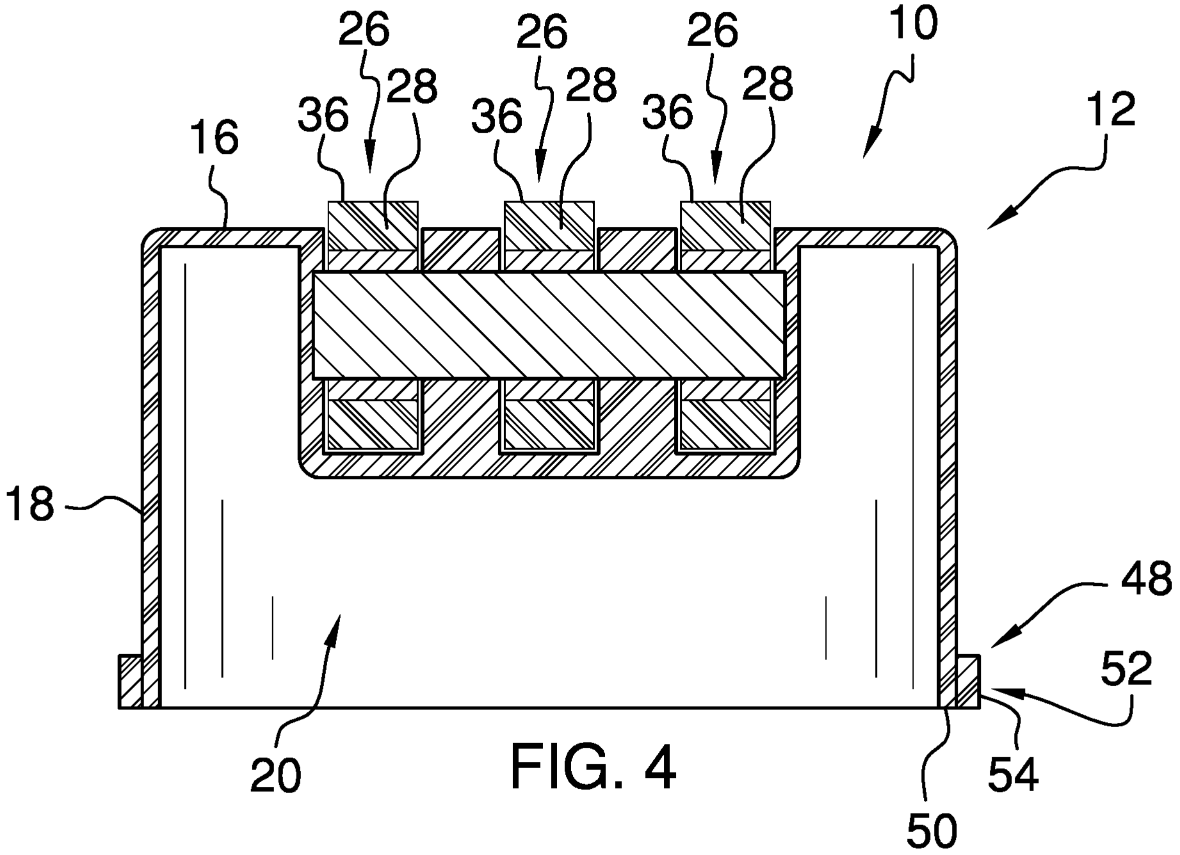
FIG. 4 is a cross-section view of an embodiment of the disclosure taken from Arrows 4-4 in FIG. 2.
Figure 5:
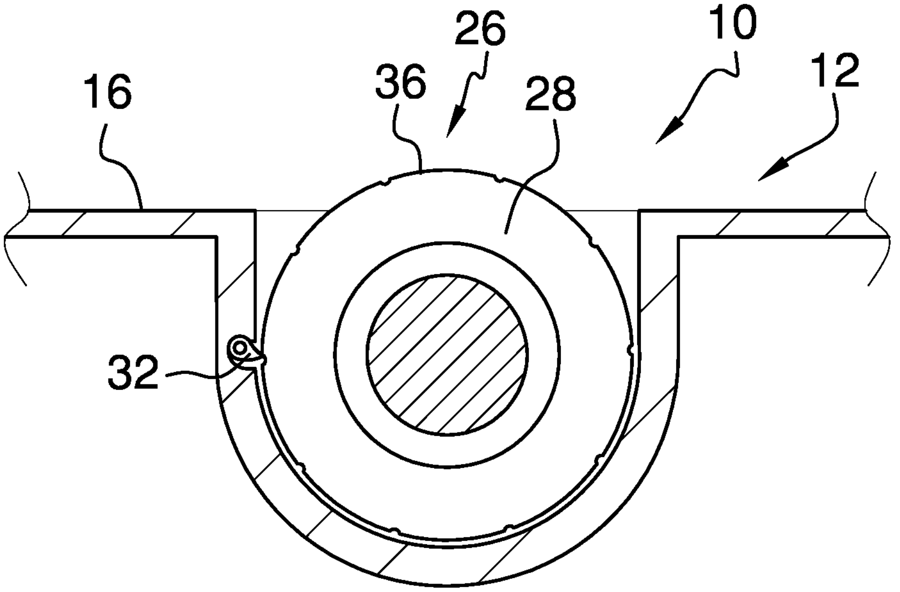
FIG. 5 is a cross-section view of an embodiment of the disclosure taken from Arrows 5-5 in FIG. 2.
Figure 6:
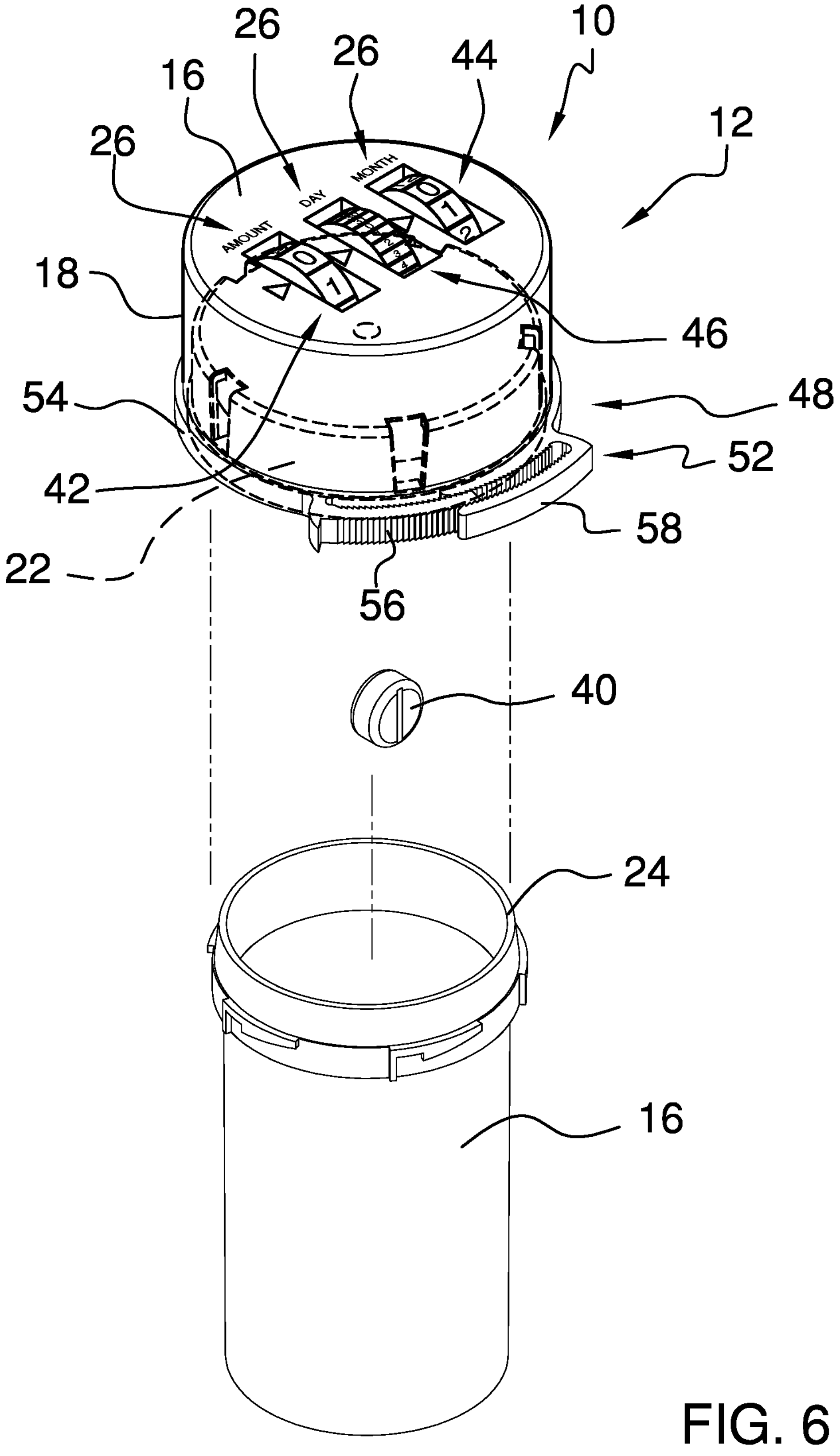
FIG. 6 is an exploded in-use view of an embodiment of the disclosure.
Figure 7:
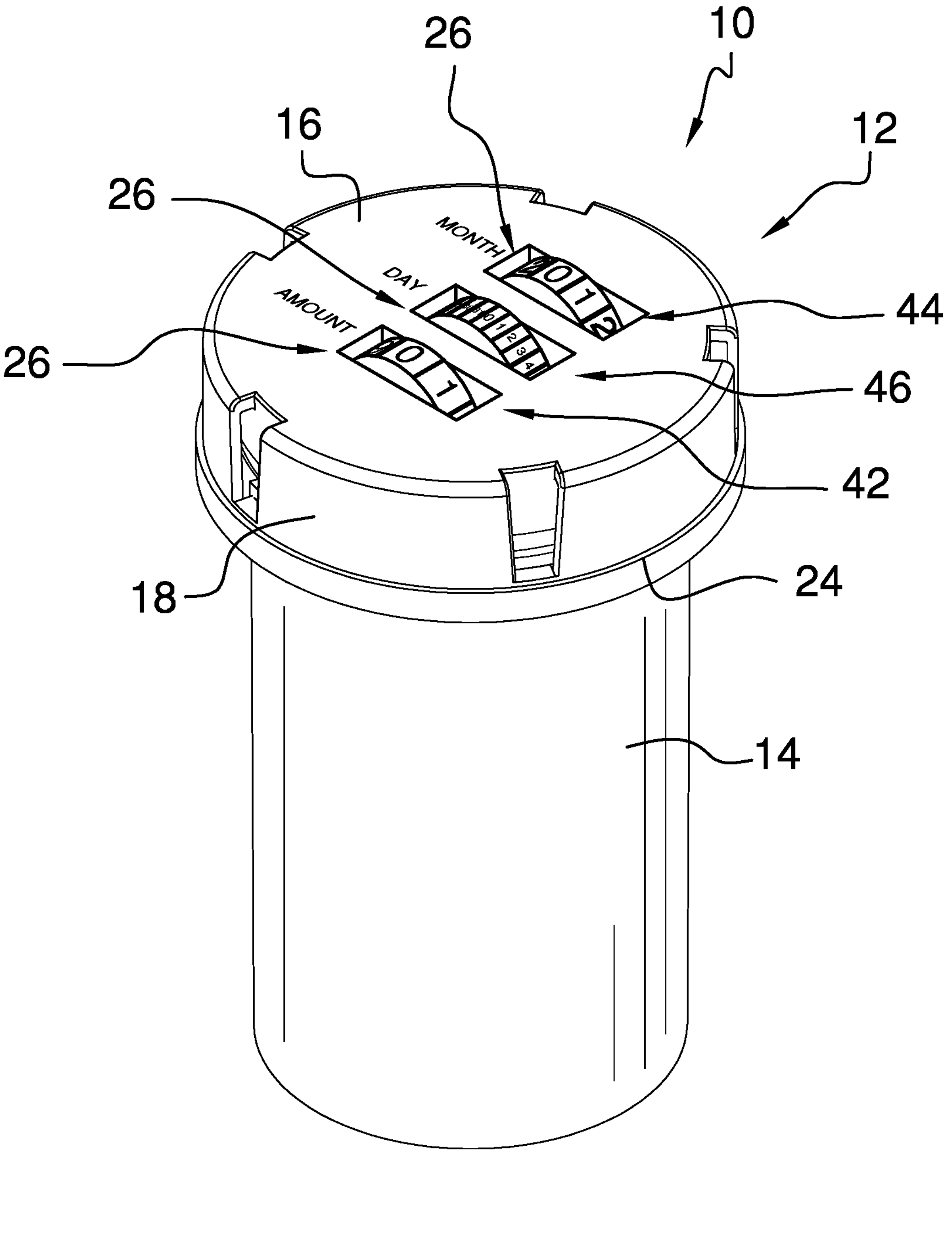
FIG. 7 is a perspective in-use view of an alternative embodiment of the disclosure.
Figure 8:
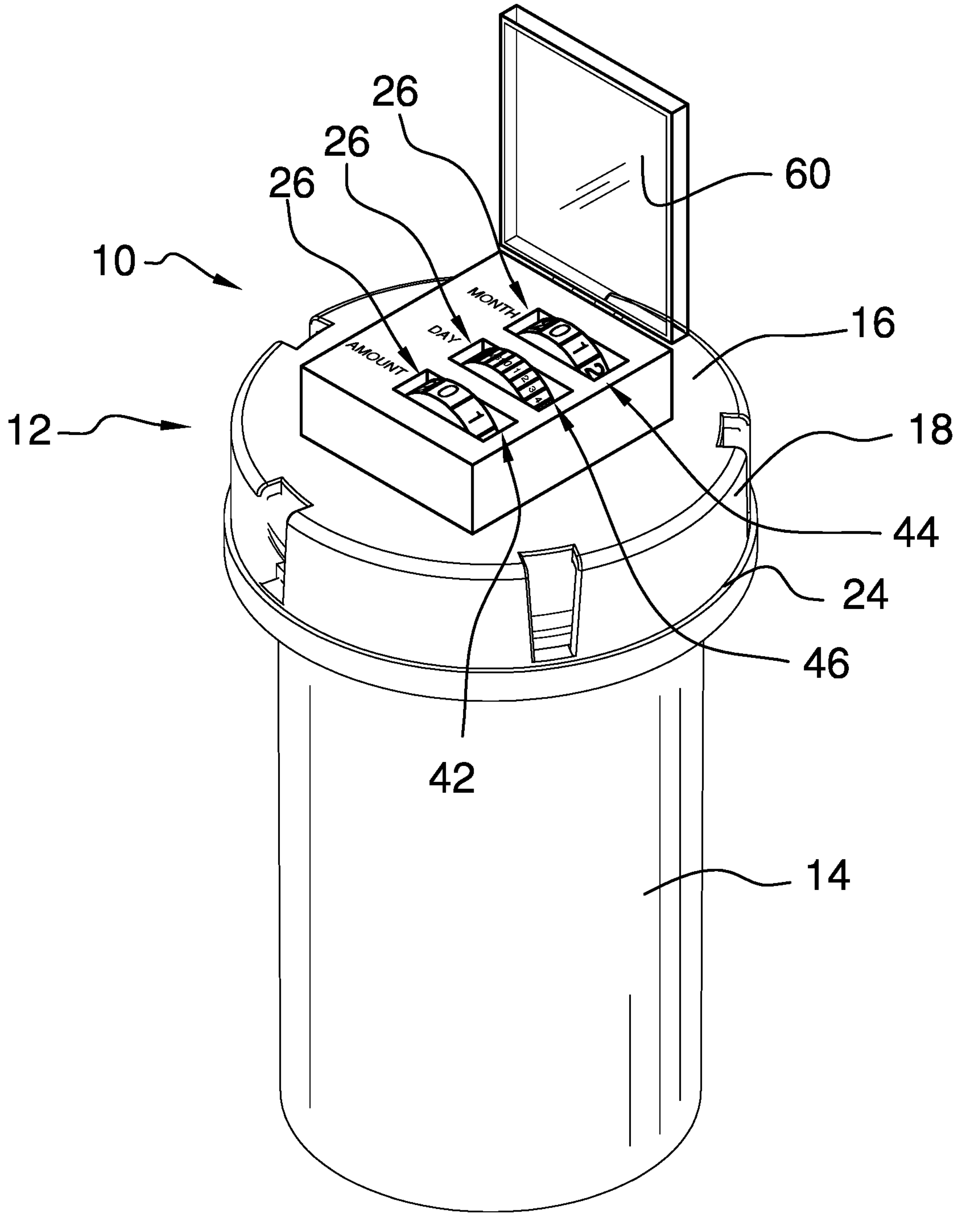
FIG. 8 is a perspective in-use view of an alternative embodiment of the disclosure.

With reference now to the drawings, and in particular to FIGS. 1 through 8 thereof, a new medication dosage reminder apparatus embodying the principles and concepts of an embodiment of the disclosure and generally designated by the reference numeral 10 will be described.

As best illustrated in FIGS. 1 through 8, the medication dosage reminder apparatus 10 generally comprises a cover 12 configured to be mounted to a medication container 14. The cover 12 has a top wall 16 and a perimeter wall 18, in which the perimeter wall 18 is coupled to and extends downwardly from the top wall 16. The perimeter wall 18 bounds a cavity 20 which has a size such that the cover 12 is configured to receive a cap 22 for the medication container 14 therein. In some embodiments, the cover 12 may attach directly to a top end 24 of the medication container 14 via a threaded connection, a latch, or other conventional means. A plurality of indicator assemblies 26 is coupled to the cover 12 for indicating dosage information for a medication 40 stored in the medication container 14. The plurality of indicator assemblies 26 is positioned on the top wall 16 of the cover 12. The dosage information at least includes a dosage amount and a dosage schedule.

Each of the plurality of indicator assemblies 26 comprises a rotating member 28, a plurality of dosage indicia 30, a pawl 32, and a selection indicia 32. The rotating member 28 is rotatably coupled to the cover 12, and a section of a perimeter surface 36 of the rotating member 28 protrudes outwardly of the cover 12 and defines a viewable position of the section of the perimeter surface 36. The rotating member 28 is rotatable in a first direction and a second direction relative to the cover 12. The rotating member 28 is cylindrically shaped such that the perimeter surface 36 forms an annular surface around the rotating member 28. The plurality of dosage indicia 30 is positioned on and circumferentially arranged around the perimeter surface 36 of the rotating member 28. The rotating member 28 is rotatable with respect to the cover 12 to position a selected one of the dosage indicia 30 at the viewing position. The pawl 32 is coupled to the cover 12 and is biased to engage the rotating member 28 to inhibit rotation of the rotating member 28 in the first direction with respect to the cover 12. The selection indicia 32 is coupled to the cover 12 adjacent to the viewing position for identifying the selected dosage indicia 30. The selection indicia 32 may comprise, for example, an arrow 38 pointing toward the viewing position but may include any symbol, graphical image, alphanumeric character, or the like configured to direct attention to the viewing position.

The plurality of indicator assemblies 26 includes an amount indicator assembly 42 for indicating the dosage amount, a month indicator assembly 44 for indicating a month of the dosage schedule, and a day indicator assembly 46 for indicating a day of the month of the dosage schedule. However, the plurality of indicator assemblies 26 may include any of a variety of other indicator assembly 26 arrangements for indicating the dosage information. For example, a single indicator assembly 26 may simultaneously indicate the dosage amount and the dosage schedule. Or one or more alternative indicator assemblies 26 may be provided for indicating a schedule such as a time of day, a day of the week, or the like.

A connector 48 is coupled to the cover 12 and is configured to connect the cover 12 to the cap 22. The connector 48 is positioned along a lower edge 50 of the perimeter wall 18 and comprises a clamp 52 for cinching the lower edge 50 of the perimeter wall 18 around the cap 22. The clamp 52 comprises a collar 54, a first latch member 56, and a second latch member 58. The collar 54 is coupled to and extends partially around the lower edge 50 of the perimeter wall 18. The first latch member 56 is coupled to a first end of the collar 54, and the second latch member 58 is coupled to a second end of the collar 54. The first and second latch members 56, 58 are movable toward each other to position the clamp 52 in a cinched condition wherein the clamp 52 constricts the lower edge 50 of the perimeter wall 18, and the first and second latch members 56, 58 are engageable with each other to retain the clamp 52 in the cinched condition. The connector 48 also may comprise a latch, a hook-and-loop fastener, a snap fit connection, or the like, in addition or alternatively to the clamp 52.

In some embodiments, a lid 60 may be movably attached to the cover 12 to shield the plurality of indicator assemblies 26 to avoid accidental movement of one or more of the plurality of indicator assemblies 26. The lid 60 may also be translucent such that the dosage information is viewable through the lid 60.

In use, the cover 12 is attached to the medication container 14, and the dosage information is selected by rotating the rotating member 28 of each of the plurality of indicator assemblies 26. The cover 12 is removed from the medication container 14, and a dose of the medication 40 is taken from the medication container 14. The cover 12 is reattached to the medication container 14, and new dosage information is selected to reflect a next dose of the medication 40 to be taken at a next scheduled time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A medication dosage reminder apparatus comprising:

a cover configured to be mounted to a medication container;

at least one indicator assembly being coupled to the cover for indicating dosage information for a medication stored in the medication container, the at least one indicator assembly comprising:

a rotating member being rotatably coupled to the cover, a section of a perimeter surface of the rotating member protruding outwardly of the cover and defining a viewable position of the section of the rotating member, the rotating member being rotatable in a first direction and a second direction relative to the cover; and a plurality of dosage indicia being positioned on and circumferentially arranged around the perimeter surface of the rotating member, the rotating member being rotatable with respect to the cover to position a selected one of the dosage indicia at the viewing position; and a connector being coupled to the cover and being configured to connect the cover to the cap, the connector being positioned along a lower edge of the perimeter wall and comprising a clamp for cinching the lower edge of the perimeter wall around the cap, wherein the clamp comprises:

a collar being coupled to and extending partially around the lower edge of the perimeter wall; and a first latch member and a second latch member, the first latch member being coupled to a first end of the collar, the second latch member being coupled to a second end of the collar, the first and second latch members being movable toward each other to position the clamp in a cinched condition wherein the clamp constricts the lower edge of the perimeter wall, the first and second latch members being engageable with each other to retain the clamp in the cinched condition.

2. A medication dosage reminder apparatus comprising:

a cover configured to be mounted to a medication container, the cover having a top wall and a perimeter wall, the perimeter wall being coupled to and extending downwardly from the top wall, the perimeter wall bounding a cavity, the cavity having a size such that the cover is configured to receive a cap for the medication container therein;

a plurality of indicator assemblies being coupled to the cover for indicating dosage information for a medication stored in the medication container, the plurality of indicator assemblies being positioned on the top wall of the cover, the dosage information at least including a dosage amount and a dosage schedule, each of the plurality of indicator assemblies comprising:

a rotating member being rotatably coupled to the cover, a section of a perimeter surface of the rotating member protruding outwardly of the cover and defining a viewable position of the section of the rotating member, the rotating member being rotatable in a first direction and a second direction relative to the cover, the rotating member being cylindrically shaped such that the perimeter surface forms an annular surface around the rotating member;

a plurality of dosage indicia being positioned on and circumferentially arranged around the perimeter surface of the rotating member, the rotating member being rotatable with respect to the cover to position a selected one of the dosage indicia at the viewing position;

a pawl being coupled to the cover and being biased to engage the rotating member to inhibit rotation of the rotating member in the first direction with respect to the cover; and a selection indicia being coupled to the cover adjacent to the viewing position for identifying the selected dosage indicia;

wherein the plurality of indicator assemblies includes:

an amount indicator assembly for indicating the dosage amount;

a month indicator assembly for indicating a month of the dosage schedule; and a day indicator assembly for indicating a day of the month of the dosage schedule; and a connector being coupled to the cover and being configured to connect the cover to the cap, the connector being positioned along a lower edge of the perimeter wall and comprising a clamp for cinching the lower edge of the perimeter wall around the cap, the clamp comprising:

a collar being coupled to and extending partially around the lower edge of the perimeter wall; and a first latch member and a second latch member, the first latch member being coupled to a first end of the collar, the second latch member being coupled to a second end of the collar, the first and second latch members being movable toward each other to position the clamp in a cinched condition wherein the clamp constricts the lower edge of the perimeter wall, the first and second latch members being engageable with each other to retain the clamp in the cinched condition.

* * * * *